United States Patent [19]

Brehm et al.

[11] Patent Number: 5,246,033

[45] Date of Patent: Sep. 21, 1993

[54] ELECTROMAGNETICALLY ACTUATABLE DOUBLE SEAT VALVE

[75] Inventors: Werner Brehm, Hemmingen; Klaus Schudt, Nordheim, both of Fed. Rep. of Germany

[73] Assignee: Robert Bosch GmbH, Stuttgart, Fed. Rep. of Germany

[21] Appl. No.: 954,914

[22] Filed: Sep. 30, 1992

[30] Foreign Application Priority Data

Nov. 15, 1991 [DE] Fed. Rep. of Germany ....... 4137555

[51] Int. Cl.$^5$ ............................................. F15B 13/044
[52] U.S. Cl. .............................. 137/625.65; 137/625.27
[58] Field of Search ........................ 137/625.27, 625.65

[56] References Cited

U.S. PATENT DOCUMENTS

| 4,844,122 | 7/1989 | Ichihashi | 137/625.65 |
| 4,915,134 | 4/1990 | Toliusis et al. | 137/625.65 |
| 4,979,542 | 12/1990 | Mesenich | 137/625.65 |

FOREIGN PATENT DOCUMENTS 8904785 4/1989 Fed. Rep. of Germany .

*Primary Examiner*—Gerald A. Michalsky
*Attorney, Agent, or Firm*—Michael J. Striker

[57] ABSTRACT

An electromagnetically actuatable double seat valve, has a housing having a housing opening and a throughgoing longitudinal opening, a valve body formed as a cylindrical hollow body slidingly guided in the housing opening, an electromagnet having an armature, a plunger fixedly connecting the armature of the electromagnet with the valve body so as to actuate the valve body and slidingly guided in the throughgoing longitudinal opening. The longitudinal opening has a part which faces away of the electromagnet and forming a consumer connection, a container connection and a pump connection. A pressure spring loads the valve body against the plunger so that a passage leads from the consumer connection to the container connection. The valve body has an end side facing away of the armature and provided with a radially outwardly extending collar. A plate closes the housing opening and supporting the pressure spring. A first flat seat is in the housing and a second opposite flat is on the plate. The collar has one side cooperating with the first flat seat formed in the housing and another side cooperating with the second flat seat formed on the plate.

4 Claims, 1 Drawing Sheet

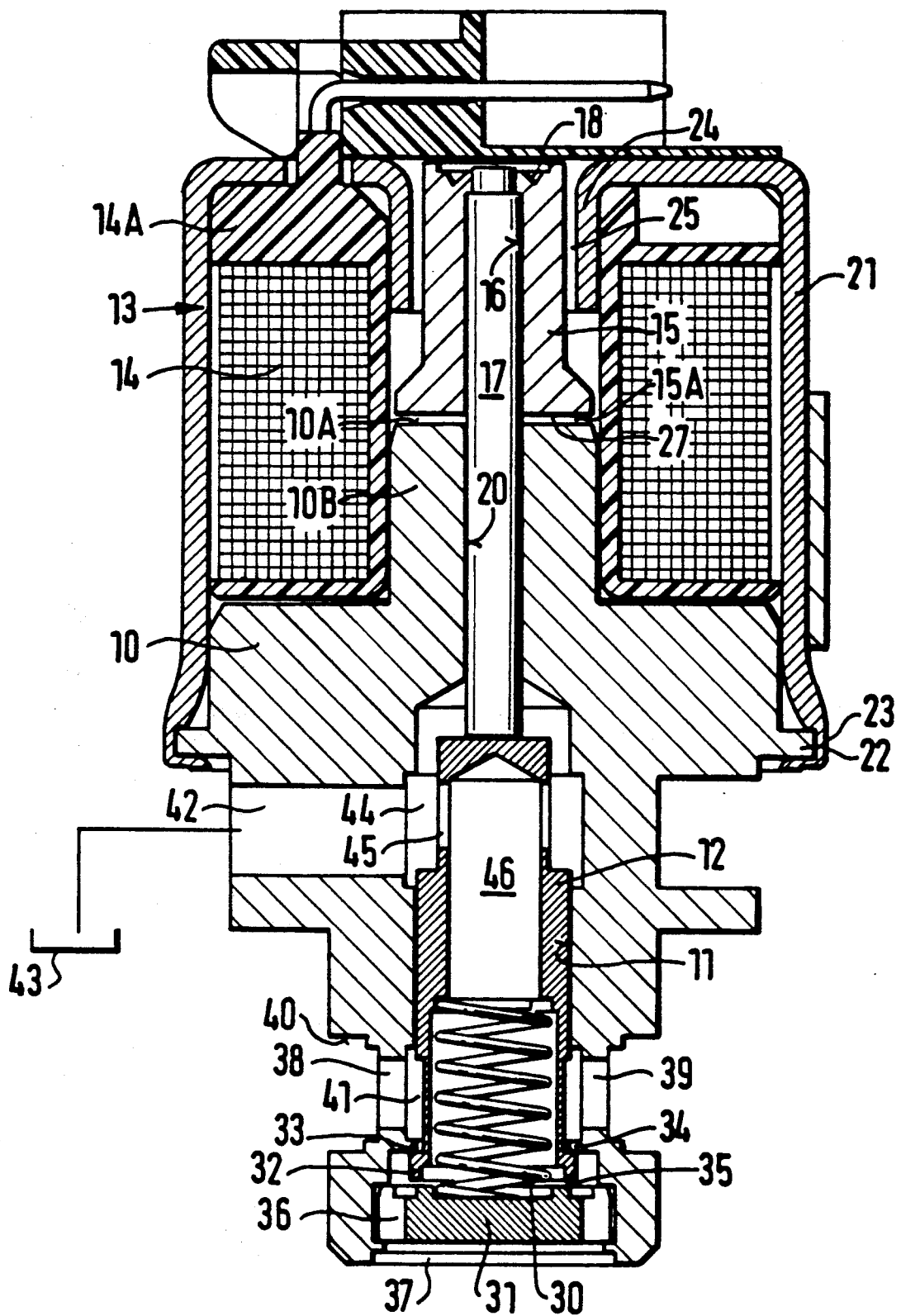

ELECTROMAGNETICALLY ACTUATABLE DOUBLE SEAT VALVE

BACKGROUND OF THE INVENTION

The present invention relates to an electromagnetically actuatable double seat valve.

More particularly, it relates to an electromagnetically actuatable double seat valve which has a valve body formed as a cylindrical hollow body sliding in a housing opening of a housing and actuatable by a plunger fixedly connected with an armature of an electric magnet.

Such double seat valves which are fast switchable are designed so that their valve bodies are formed as a ball cooperating with two opposite valve seats. One of such electromagnetically actuatable double seat valves is disclosed for example in the German document DE-GM 8,904,785. Such valves, especially for controlling automatic transmissions in motor vehicles, must be switch very fast which requires a small stroke of the valve body. In this manner no great flow cross sections can be obtained, or in other words, the throughflow quantity of such a valve is relatively low.

SUMMARY OF THE INVENTION

Accordingly, it is an object of the present invention to provide an electromagnetically actuatable double seat valve, which avoids the disadvantages of the prior art.

More particularly, it is an object of the present invention to provide an electromagnetically actuatable double seat valve, which despite high switching speed and low stroke, has a relatively high throughflow quantity.

In accordance with another embodiment the armature chamber is not under pressure, or in other words there is no connection to a supply. Therefore, no dirtying particles can penetrate into the working air gap. Moreover, the hydraulic part is completely separated from the magnetic part by a nonmagnetic plunger. In other words, no magnetic dissipation flow is produced via the hydraulic part, so that no magnetic dirtying particles can be pulled by the magnetic field into the contamination-risky regions.

In accordance with another embodiment, the auxiliary air gap is designed so that relatively low magnetic transverse forces are produced on the armature. Therefore the armature support is not subjected to strong loads and only low sliding wear of the plunger and of the plunger guide occurs.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawing is a view schematically showing an electromagnetically actuatable double seat valve in accordance with the present invention.

DESCRIPTION OF A PREFERRED EMBODIMENT

A double seat valve in accordance with the present invention has a housing which is identified with reference numeral 10 and provided with a longitudinal opening 11 in its lower part. A valve body 12 which is formed as a cylindrical hollow body is slidingly guided in the longitudinal opening 11. An electromagnet 13 with a coil 14 inside in a coil body 14A and a cylindrical armature 15 are located in the upper part of the housing.

The armature 15 has a central, throughgoing longitudinal opening 16. A plunger 17 is mounted in the longitudinal opening 16, for example by a mortazing 18. The plunger 17 extends through an opening 20 which is axis-parallel to the longitudinal opening 11, and into an upper part of the housing 10. The plunger is composed of a non-magnetic material. The electromagnet 13 is connected with the housing 10 by a sheet metal housing 21 which surrounds it, and in particular is connected on a flange-like edge 22 by a mortazing 23. The sheet metal housing 21 has a drawn-in wall wall 24 in its upper part. The armature 15 is located in the wall 24 with a sufficient play so that an auxiliary air gap 25 is formed. A working air gap 27 is provided between the lower end side 15A of the armature 15 and the upper end side 10A of the housing 10. The coil body 14A which receives the coil 14 extends substantially to a third of its length in an upper part of the housing 10, in particular on a projection 10B provided in its region.

The lower part of the housing 10 has a smaller diameter than the upper part. It is elongated and has the above mentioned longitudinal opening 11 for slidingly guiding the valve body 12. A pressure spring 30 acts on it. It is supported on a plate 31 arranged at the upper end of the longitudinal opening 11 and presses the valve body 12 against the plunger 17. At its end facing away of the plunger 17, the valve body has a radially outwardly extending collar 32. The collar can abut on the one hand on a flat valve seat 33 formed as an inwardly projecting bead 34 on the longitudinal opening 11. On the other hand it abuts against a flat valve seat 35 formed by an end side of the plate 31.

Several longitudinal grooves 36 are formed on the outer periphery of the plate and communicate with a consumer connection 37. Above the collar 34, at least two opposite transverse openings 38 and 39 extend from above into the longitudinal opening 11. They are connected with a pump connection 40. The openings 38 and 39 open into a ring groove 41 formed on the longitudinal opening 11. Substantially in a central part of the housing 10, a transverse opening 42 extends from outside into the longitudinal opening 11 and forms a connection to a container 43. The transverse opening 42 opens in a ring groove 44 formed in the longitudinal opening 11. In this region a transverse opening 45 passes through the upper part of the valve body 12 and extends into a cylindrical hollow 46 of the valve body 12.

When the double seat valve is currentless, the valve body 12 is pressed by the pressure spring 36 with its collar 32 against the valve seat 33. Therefore, the pump connection 40 is separated from the consumer connection 37, since no pressure medium can flow through the valve seat 33. In this position the valve body however connects the consumer connection through the longitudinal grooves 36 and the valve body lifted from the valve seat 35 as well as the hollow 46 in it and the transverse opening 45 with the consumer connection 42. The pressure medium flows from the consumer to the container.

When the electromotor 13 is energized, the armature 15 is pulled in direction of the magnet pole 10B by the electromagnetic force and presses through the plunger 17 against the valve body 12. Now the collar 32 of the valve body 12 is lifted from the valve seat 33 and abuts against the valve seat 35. Thereby the communication from the consumer connection 42 to the working connection 37 is interrupted, and simultaneously a communication from the pump connection 40 through the open valve seat 33 to the consumer connection 37 is established. The consumer is supplied with the pressure medium.

When the current flows through the coil 14, a magnetic flux is produced. The magnetic flux closes in the working air gap 27 through the magnet pole 10B, the metal sheet housing 21, the auxiliary air gap 25 and through the armature 15.

It will be understood that each of the elements described above, or two or more together, may also find a useful application in other types of constructions differing from the types described above.

While the invention has been illustrated and described as embodied in an electromagnetically actuatable double seat valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electromagnetically actuable double seat valve, comprising a housing having a housing opening and a throughgoing longitudinal opening; a valve body formed as a cylindrical hollow body slidingly guided in said housing opening; an electromagnet having an armature; a plunger fixedly connected with said armature of said electromagnet and slidingly guided in said throughgoing longitudinal opening, said valve body being formed as a part which is separate from said armature with said plunger and being actuated by said plunger, said longitudinal opening having a part which faces away of said electromagnet and forms a consumer connection, a container connection and a pump connection; a pressure spring spring loading said valve body against said plunger so that a passage leads from said consumer connection to said container connection, said valve body having an end side facing away of said armature and provided with a radially outwardly extending collar; a plate closing said housing opening and supporting said pressure spring; a first flat seat formed in said housing and a second opposite flat seat formed on said plate, said collar having one side cooperating with said first flat seat formed in said housing and another side cooperating with said second flat seat formed on said plate.

2. A double seat valve as defined in claim 1, wherein said plate has recesses for a pressure medium throughflow.

3. A double seat valve as defined in claim 2, wherein said plate has an outer periphery, said recesses are formed as longitudinal grooves on said outer periphery of said plate.

4. A double seat valve as defined in claim 1, wherein said armature is cylindrical and is provided with an axially extending auxiliary gap, said armature and said housing forming therebetween a radially extending working gap.

* * * * *